Patented Apr. 27, 1948

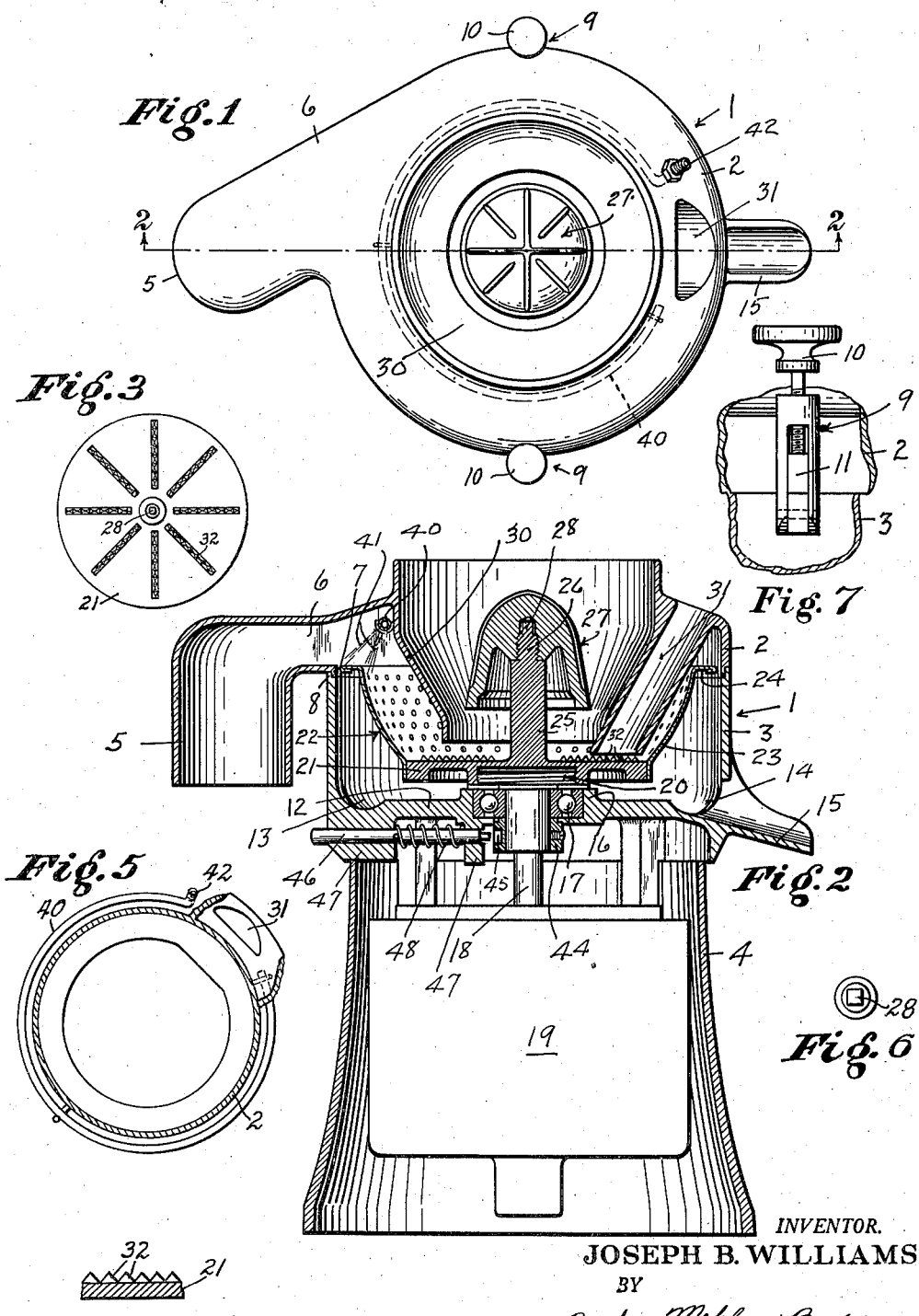

2,440,425

UNITED STATES PATENT OFFICE 2,440,425

FRUIT AND VEGETABLE JUICE EXTRACTOR

Joseph B. Williams, San Francisco, Calif.

Application September 23, 1944, Serial No. 555,515

2 Claims. (Cl. 146—3)

This invention relates to a juicer.

One of the objects of the invention is the provision of a juicer that is adapted to remove the juice from fruit or vegetables as desired without requiring special adjustment for one or the other.

An additional object of the invention is the provision of a simple, safe and sanitary juicer that is adapted to separate the juice from vegetables or fruit and to decimate or pulp vegetable and fruit bodies separately or simultaneously for such separation or extraction of the juice therefrom, and which juicer automatically discharges the juice exhausted pulp and the juice separated therefrom at spaced points separate from each other.

Other objects and advantages will appear in the description and drawings.

While the present invention is not restricted to use with any particular fruit or vegetable, the use of orange juice and grape fruit juice is so prevalent that the juicer illustrated will be explained with respect to such fruit.

In the drawings,

Fig. 1 is a plan view of the juicer.

Fig. 2 is a vertical sectional view taken along the line 2—2 of Fig. 1.

Fig. 3 is a plan view of the bottom of the pulp basket separate from the basket and juicer.

Fig. 4 is an enlarged fragmentary sectional view through part of the bottom of the juicer showing in elevation the teeth formed therein and projecting from the upper side.

Fig. 5 is a plan view of the fluid conduit that is incorporated in the juicer for conducting a cleaning fluid into the juicer for cleaning it. A portion of the housing is indicated in section, but the outer wall of the latter is not shown.

Fig. 6 is an enlarged plan view of the upper end of the reamer shaft separate from the juicer, indicating the contour of said upper end transversely of the axis of the shaft.

Fig. 7 is a fragmentary elevational view of one of the clamps for removably securing the upper part of the juicer housing in position over the basket. The wall of said housing and of said upper part of the juicer are partly in section in this view.

In detail, the juicer illustrated in the drawings comprises a housing generally designated 1 that is divided into an upper part 2 and a lower part 3 that are supported on hollow standard 4.

In general, the housing is cylindrical although the upper part 2 thereof is formed with a downwardly opening spout 5 projecting from a side thereof, and which spout is connected with the housing by a passageway 6 that extends tangentially from the cylindrical walls of the part 2.

The upper part 2 of the housing is formed with an annular downwardly projecting lip 7 around its lower edge that is adapted to overlap a correspondingly formed upper lip 8 on the upper edge of the lower part 3 of said housing, thereby insuring a fluid tight seal between the parts. The upper and lower part of the housing are releasably held in this fluid tight relationship by a pair of screw clamps 9 pivotally secured on part 3 for swinging across the juncture between parts 2, 3 to position thumb screw 10 of each clamp over a projecting lug 11 on part 2. Upon tightening each thumb screw against each lug 11 the part 2 is tightly secured against the part 3, and when the screws are loosened the clamps may be swung free of the lugs for removal of part 2.

The lower part 3 of housing 1 is formed with a bottom 12, which bottom has a drain groove 13 at its juncture with the side of said part. A discharge opening 14 formed in part 3 opens into the groove 13 for discharge of juice that drains into said groove, and a spout 15 projecting from said part 3 is adapted to carry the juice away from said opening for flowing into any desired receptacle that may be positioned below said spout.

The bottom 12 is also formed with a centrally apertured upwardly projecting boss 16 in which aperture is secured a bearing 17 for the vertical drive shaft 18 of a motor 19 that is in turn enclosed by the standard 4 and secured thereon.

The shaft 18 is enlarged at its upper end above the bearing 17 as at 20, and which enlargement is externally threaded for engaging the threads in a downwardly opening recess centrally of the imperforate bottom 21 of a pulp receiving basket 22 having perforated side walls 23.

The side walls 23 of basket 22 extend divergently or slantingly upwardly from bottom 21, and are slightly curved in their upward extension to present a generally bowl-like contour. The walls 23 are spaced from the sides of the lower part 3 of housing 1, and a radially outwardly projecting annular flange 24 on the walls 23 at their upper edge extend almost to the inner cylindrical wall of upper part 2 and at a level just below the passageway 6 so that any material discharged from the basket over its upper edge will be flung into said passageway. The edge of flange 24 is so close to the inner cylindrical wall of part 2 as to preclude any solids such as fruit pulp from passing between said flange and wall into the drain groove in part 3.

The bottom 21 of basket 22 is also centrally formed with an upwardly projecting vertical shaft 25 that is coaxial with shaft 18 and that virtually constitutes an extension of the latter when the basket is threadedly secured on shaft 18. This shaft 25 is reduced at its upper end portion 26 to provide a shoulder. The said portion 26 is externally threaded for threaded engagement in a threaded central downwardly opening recess formed within a more or less conical reamer 27 of the type adapted to ream the pulp out of orange halves or the halves of other fruit. These reamers are conventional in external contour, usually being grooved or ribbed to facilitate the reaming operation. The edges of the threaded recess in the reamer are adapted to seat on the said shoulder of the shaft 25 as seen in Fig. 2, and a part 28 of the portion 26 at its terminating upper end may be square in contour transversely of the axis of the shaft 25 for a purpose later to be described.

The upper part 2 of the housing 1 is formed with a central opening, and from the edges of which opening a tubular flange 30 extends downwardly into the basket 22 coaxial therewith, and spaced between the reamer 27 and the sides 23 of said basket. This flange 30 preferably tapers inwardly as it projects downwardly, and a passageway 31 is formed on the outer side thereof extending slantingly downwardly to a point spaced only slightly from the bottom 21 of the basket.

This passageway 31 is preferably flat or relatively flat on its inner side that is coincident with flange 30 and is arcuate on its opposite side as seen in Figs. 1, 5. Passageway 31 is intended for vegetables that may be cut in pieces adapted to pass therethrough, and the lower open end of said passageway is scanned by radially extending rows of upwardly projecting teeth 32 formed on bottom 21. Any vegetables forced out of the lower end of passageway 31, or passing out of said lower end, will be rapidly decimated, grated or shredded by the teeth 32.

In order to prevent merely annular grooves from being formed in vegetables that engage teeth 32, the teeth in the rows are arranged so that those in adjacent pairs of rows do not follow the same circular path, but different paths. This insures a sufficiently fine grating or shredding of the vegetables to free the juice for separation from the grated or shredded pulp. The arrangement of the teeth in the different rows is best seen in Fig. 3.

In operation, the operator manually applies the cut face of an orange or fruit half to the reamer 27 when motor 19 is rapidly revolving the reamer and basket 22. The juice and pulp are caught in basket 22 through the perforated sides of which the juice is quickly expelled and is thrown against the inner cylindrical walls of the lower part 3 of the housing. The juice drains down the said walls into groove 13 for discharge therefrom through opening 14 and carrying by spout 15 to a suitable receptacle.

The juice from the pulp is also extracted by centrifugal pressure therefrom for discharge through the perforations in the basket side walls 23.

Due to the slant of the sides of basket 22 the pulp tends to move upwardly along a helical path of travel for discharge over the flange 24 and through the passageway 6 for discharge through spout 5 into any suitable receptacle positioned below said spout. However, this movement of the pulp is accelerated and is accomplished satisfactorily by reason of the relatively strong air current generated by the revolving basket and pulp therein which generation is similar to the action in a suction blower. Air is drawn into the basket through the flange 30 and moves upwardly over the pulp in the basket, expediting the upward movement of the latter, and is discharged through passageway 6 carrying with it the pulp that is released from the basket over flange 24. This air current is quite important in the accomplishment of the desired results. The pulp that is discharged from the juicer is practically free from juice and the seeds are, of course, thrown out with the pulp.

Where desired, vegetable juice may be produced by feeding vegetable pieces through passageway 31 to the bottom 21 for shredding or grating by the teeth 32 on said bottom. This feeding of said pieces to bottom 21 may be done at the same time fruit is being reamed by the reamer. Thus a mixture of fresh fruit pieces and vegetables and a simultaneous discharge of the pulp from both the vegetables and fruit may be accomplished by the same machine.

Around the outerside of flange 30 and adjacent the top of the upper part 2 of the housing is a tube 40 having discharge apertures therein arranged for ejecting sprays 41 (Fig. 2) any desired fluid, which may be hot water or steam or both or any other desired cleaner in any desired direction, but preferably into the basket. This tube 40 is secured to the upper part of the housing and one end 42 projects from said part and may be threaded or otherwise formed for connection with the coupling of a hose or pipe, and the latter (not shown) may be connected with one or more sources of cleaning and rinsing fluids.

When a cleaning of the juicer is desired it is merely necessary to turn on the cleaning fluid. If this fluid is water, the same will strike the revolving inner surface of the basket and will not only clean such surface but part will be thrown through the perforations for cleaning the interior of the lower part of the housing. Part will move over the flange 24 and through passageway 6 for cleaning the inner walls of the upper part of the housing including said flange and passageway. In fact, every part of the juicer that is concealed and therefore not available for wiping or cleaning by hand, will be thoroughly cleaned by the cleaning fluid ejected from tube 40.

The above structure makes possible a quick and thorough cleansing of the interior of the juicer at any time, and is very valuable where different drinks may be prepared by using the same juicer and it is undesirable that one drink is contaminated by another.

It is desirable at times to either replace the reamer 27 or basket 22, in which case the motor is first stopped. A collar 44 secured on shaft 18 below bearing 17 is provided with a radially outwardly opening recess 45 that is adapted to receive therein one end of a horizontal pin 46. This pin 46 is slidably supported for longitudinal movement in coaxial bores formed in downwardly extending projections 47 on the bottom 12 of the lower part 3 of the housing 1. A spring 48 reacting between one of said projections and the pin itself, through which one end of the spring extends, yieldably holds the pin so that its inner end is out of the recess 45. The outer end of the pin projects outwardly of the housing 1. Thus the pin may be pushed longitudinally for engagement of its inner end in recess 45 whereby the shaft 18 will be locked stationary and the reamer may be unscrewed from the upper end 26 of shaft 25 or the basket 22 may be unscrewed from the portion 20 of shaft 18. It is understood, of course, that the upper part 2 of the housing is removed when the basket is unscrewed. The pin 46 is automatically withdrawn from recess 45 when the holding pressure on the pin is released, which holding pressure is ordinarily applied by a finger of the operator.

It is to be understood that the drawings and description are not to be considered as restrictive of the invention but merely illustrative thereof.

I claim:

1. In a juicer having a vertical, cylindrical sided housing and a rotary shaft coaxial therewith, a fruit reamer secured to the upper end of said shaft and a basket concentric with said reamer secured to said shaft below the reamer for receiving fruit pulp and juice reamed by said reamer, a top on said housing having a central opening for access to said reamer for reaming said pulp and juice therefrom, a depending cylindrical flange on said top extending from the edges of said opening into said basket and terminating at a point above the bottom of said basket, an open ended conduit for vegetables extending downwardly through the wall of said housing and into said basket to a point slightly spaced above said bottom eccentric to the central axis of the basket, projections on said bottom for grating vegetables fed through said conduit, and means for rotating said shaft whereby said reamer and said bottom will be rotated for simultaneously reaming fruit and grating vegetables if so desired.

2. In a juicer having a rotary basket provided with perforated side walls, an imperforate bottom wall and an open top, means for feeding vegetables and the like into said basket and against the upper side of said bottom wall at a point spaced from its axis of rotation, said bottom wall having a roughened upper surface for grating vegetables so fed, means for holding the vegetables during such grating, a vertical shaft coaxial with said basket, means for removably securing said basket to said shaft, means for rotating said shaft and basket together about the axis of the shaft, a fruit reamer secured on the upper end of said shaft, a vertical open ended cylindrical element coaxial with said reamer and spaced therefrom positioned with its open lower end adjacent but spaced from the said bottom wall, a housing surrounding said basket having a lower end wall below said bottom wall, means supporting said element on said housing rigid therewith, a pulp discharge outlet formed in said housing at a level above the basket and a juice discharge outlet formed in said housing at a level below said basket.

JOSEPH B. WILLIAMS.

REFERENCES CITED

The following references are of record in the file of this patent:

UNITED STATES PATENTS

| Number | Name | Date |
| --- | --- | --- |
| 1,389,454 | Murphy | Aug. 30, 1921 |
| 1,886,092 | Graham | Nov. 1, 1932 |
| 2,026,918 | Streckfuss | Jan. 7, 1936 |
| 2,206,204 | Richli | July 2, 1940 |
| 2,249,817 | Fromm | July 22, 1941 |
| 2,302,138 | Nicholson | Nov. 17, 1942 |
| 2,311,379 | Gillanders | Feb. 16, 1943 |
| 2,333,190 | McKinnis | Nov. 2, 1943 |